July 30, 1929. J. MILLER, JR 1,722,589
WORK FEEDING DEVICE FOR VERTICAL DISK GRINDERS
Filed Sept. 2, 1927 5 Sheets-Sheet 1
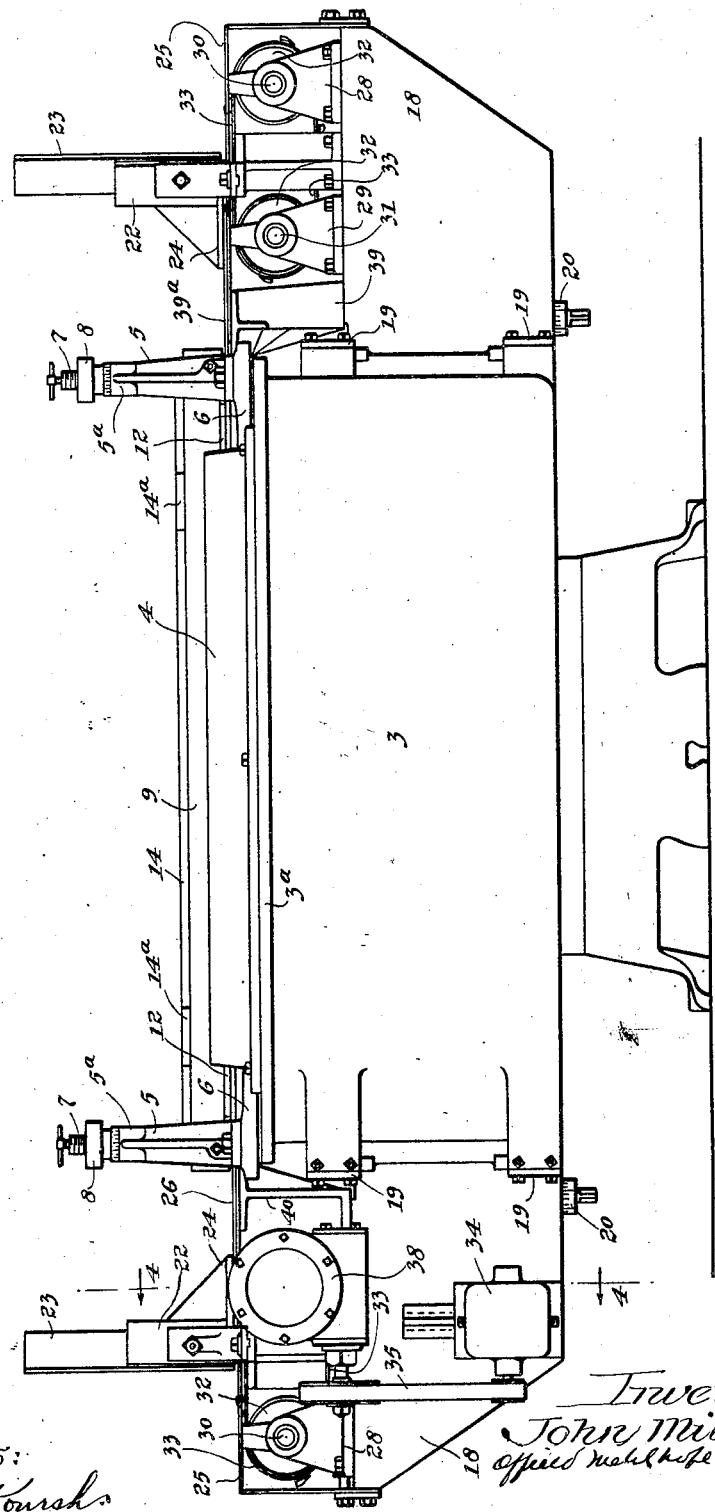

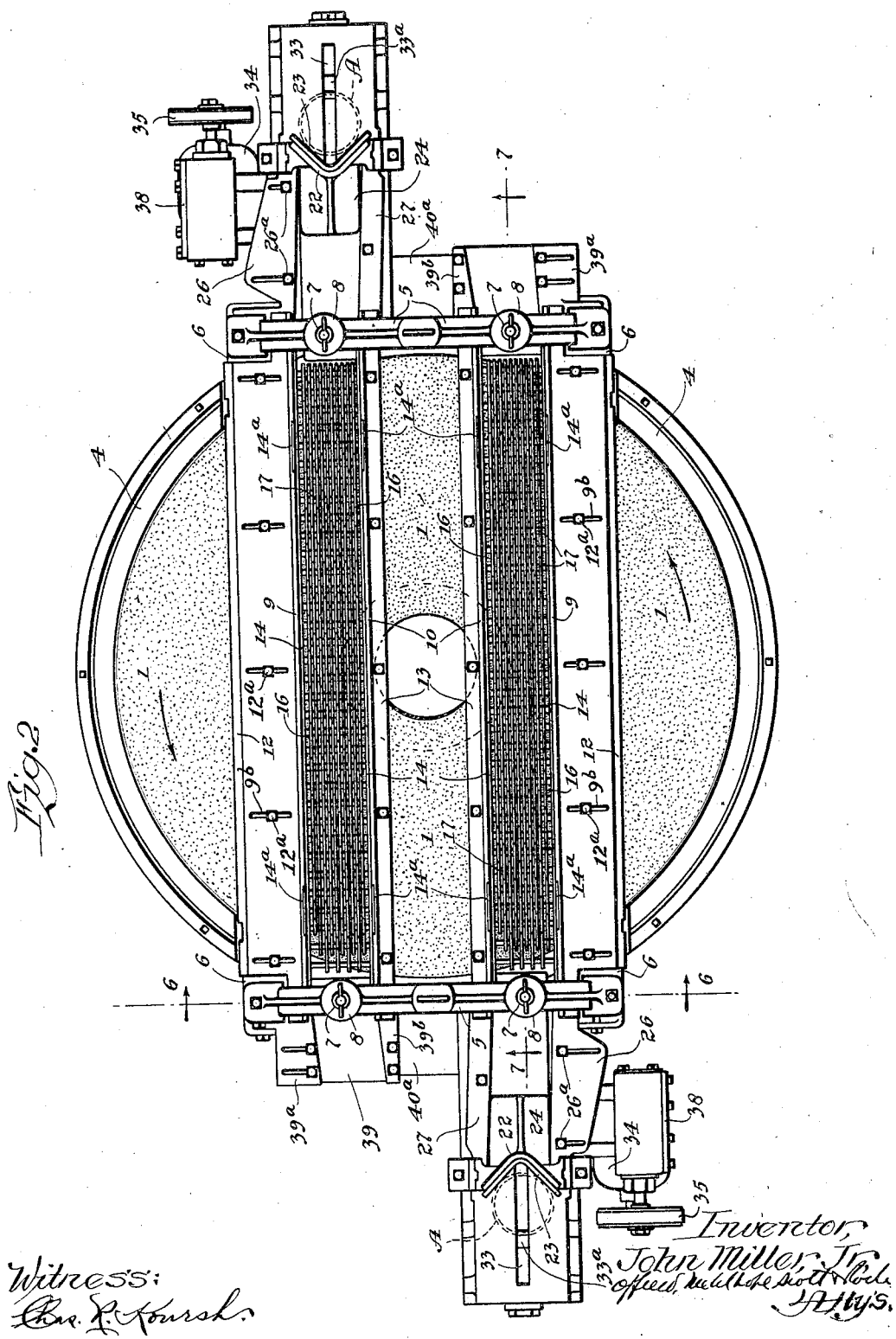

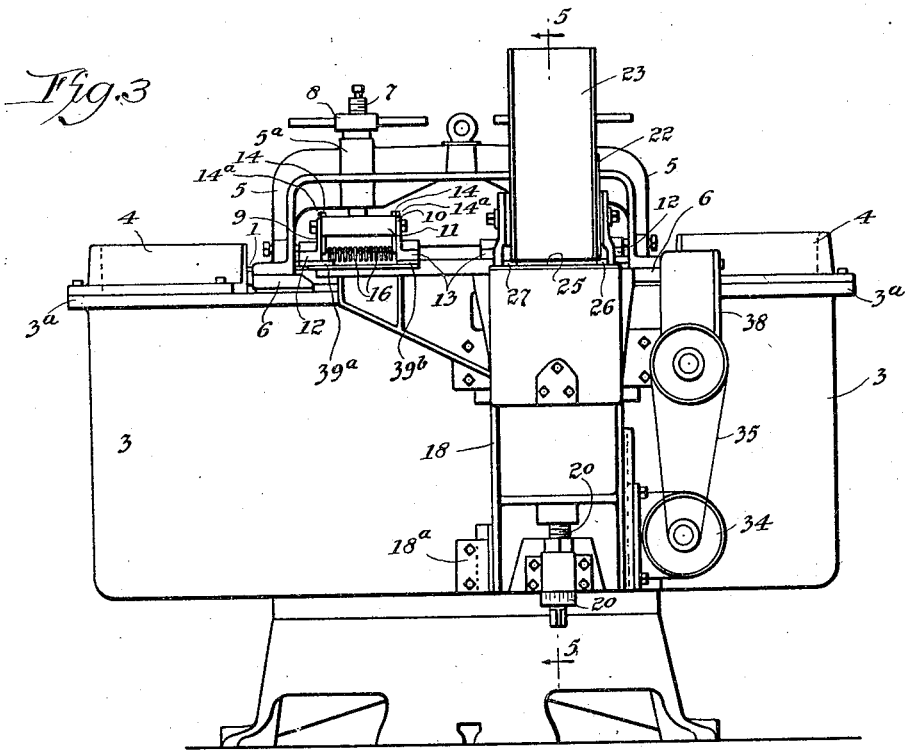
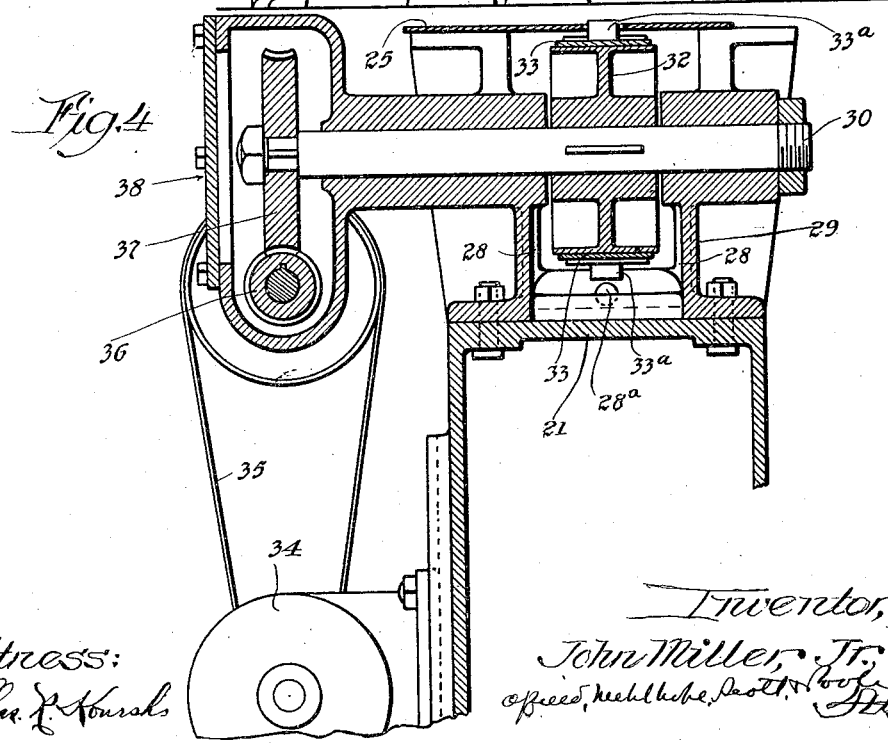

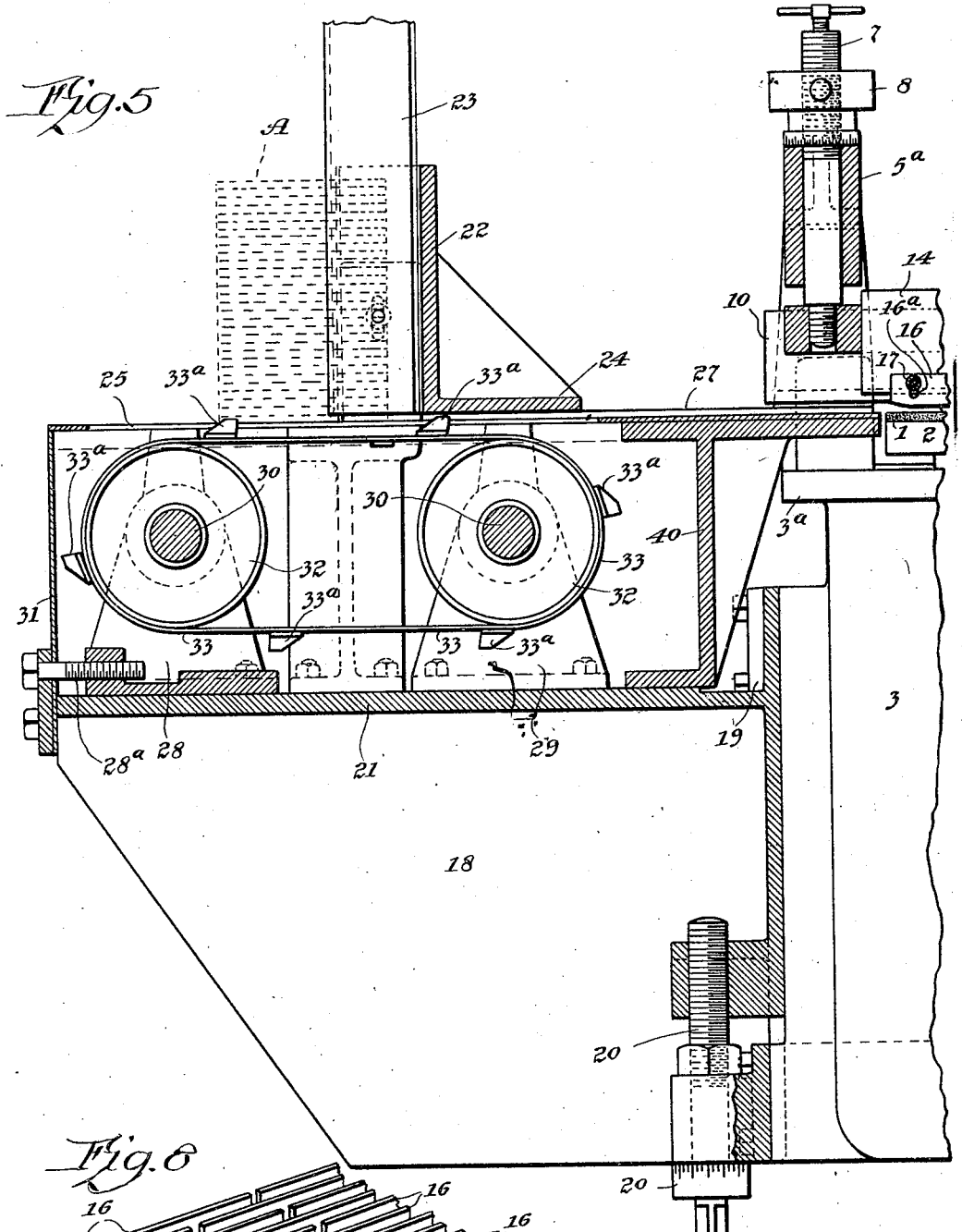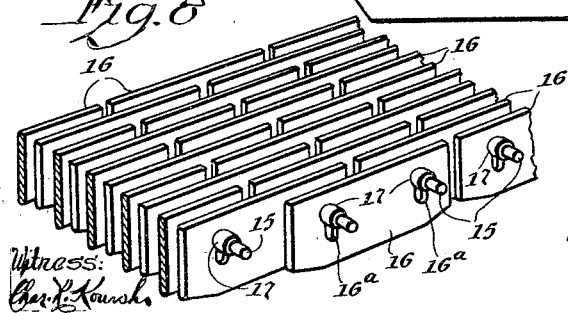

Patented July 30, 1929.

1,722,589

UNITED STATES PATENT OFFICE.

JOHN MILLER, JR., OF BELOIT, WISCONSIN, ASSIGNOR TO CHARLES H. BESLY AND COMPANY, OF CHICAGO, ILLINOIS, A CORPORATION OF ILLINOIS.

WORK-FEEDING DEVICE FOR VERTICAL DISK GRINDERS.

Application filed September 2, 1927. Serial No. 217,041.

This invention relates to improvements in work feeding devices for spindle disk grinders, and more particularly to grinding machines of the vertical spindle type equipped with a feeding attachment for handling small flat work, such as piston rings and the like.

The purpose of a machine embodying the features herein disclosed, is especially that of flattening one face or side of the work after it has been rough ground and preparatory to the final or finishing grinding operation.

Taking piston rings as an example of the class of work requiring a flattening cut, it may be explained that unless one face of the rings is perfectly flat they are quite likely to be warped or drawn out of shape when they are placed in a magnetic chuck for the finishing grinding operation, and for the reason that the rings are so thin that the magnetism of the chuck distorts them. Consequently, it is necessary to have the face in contact with the chuck perfectly flat.

The machine is not limited in its use to the flat grinding of piston rings, however, but can be used for different kinds of work where rapid and efficient grinding is desired.

A preferred embodiment of the grinding machine is illustrated in the accompanying drawings, in which Figure 1 is a view in side elevation of a grinding machine equipped with the work feeding device.

Figure 2 is a top plan view of the machine and feeding device.

Figure 3 is a view of the machine in end elevation.

Figure 4 is an enlarged detail view in vertical section taken on line 4—4 of Figure 1.

Figure 5 is an enlarged detail view in vertical section through the work feeding mechanism, as taken on line 5—5 of Figure 3.

Figure 6:
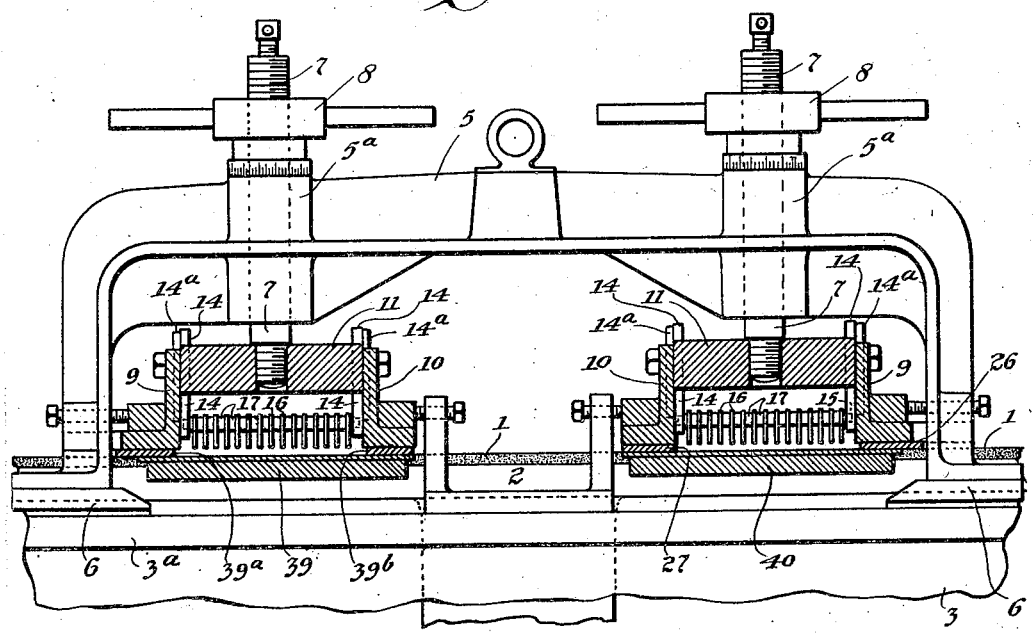
Figure 6 is an enlarged detail view in vertical transverse section taken on line 6—6 of Figure 1.
Figure 7:
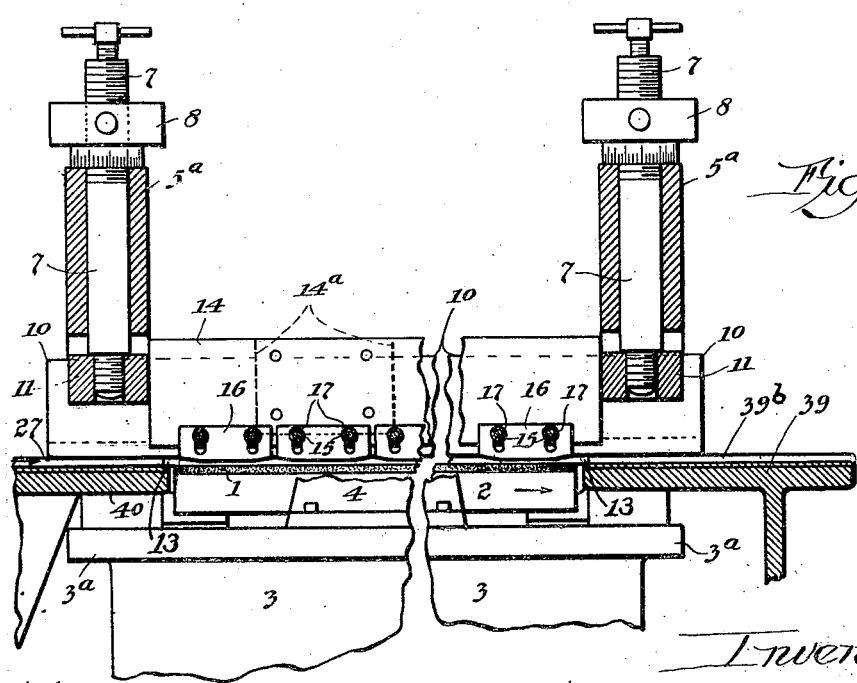

Figure 7 is an enlarged detail view in vertical longitudinal section taken on line 7—7 of Figure 2; and Figure 8 is a perspective view of a section of the pressure rack The work feeding mechanism may form a part of any standard vertical spindle grinder either as an integral part thereof or as an attachment which may be applied thereto. For this reason the details of the construction of the grinding machine are not important to a complete disclosure of the invention. As well known in the art, a vertical disk grinder is a machine having a grinding disk turning on a vertical axis, the disk being mounted at the upper end of a spindle journalled in a housing resting on the floor beneath the disk. The machine herein illustrated is one of approved design having a disk of relatively large diameter, that is, between four and five feet. The grinding disk proper 1, is a flat disk of abrasive material applied to the upper face of a metal disk 2 fixed to the upper end of a spindle (not shown) which is enclosed with the housing or casing 3. The spindle is preferably directly driven by a motor within the housing, but not shown for the reason already stated.

The housing encircles the edge or rim of the disk, having a flanged edge 3ª supporting a dust ring 4 projecting a few inches above the surface of the disk. Sections of this ring, however, are cut away on opposite sides of the machine to accommodate the feeding mechanism which is supported on the housing and extends from one side to the other above the disk.

The preferred design is what may be termed a duplex machine which provides for two grinding operations being carried on at once and thus doubling the capacity of the machine. In other words, the work may be fed to the machine from opposite sides traversing the face of the disk in opposite directions and discharged from opposite sides. The duplex type, however, is merely a duplication of the equipment for a single feed machine and therefore the details of a single feeding mechanism or unit need only be described.

Speaking generally, the work is fed automatically from a magazine on one side of the machine flatwise onto the revolving surface of the disk, one behind the other in rapid succession, being guided between rails which are offset a short distance from but parallel with the true diameter of the disk. The direction of movement of the work is likewise with the direction of rotation of the disk, although the work travels in a straight line, the contact of the disk with the surface of the work carrying it across and at the same time rotating it bodily. Moreover, a light and uniform downward pressure is maintained on the work by a flexible pressure rack consisting of a multitude of bars loosely arranged on edge above the path of the work.

Referring now to the construction of the machine operating as above briefly outlined, the means for guiding the work across the face of the grinding disk will first be described. Mounted on the upper edge of the grinder housing and on opposite sides thereof, are two inverted U-shaped supporting frames 5—5, their ends being bolted down to base plates 6—6 projecting slightly beyond the flanged edge of the grinder housing from opposite sides. Each of these supporting frames have vertical bearings $5^a$—$5^a$ in which are fitted vertical studs 7—7 which support the work guide bars and pressure rack of each unit. A micrometer adjusting head 8 is mounted at the upper end of each stud and rotated by handles for lowering and raising the studs at each end of the unit whereby the same may be adjusted vertically with respect to the face of the grinding disk.

Confining the description to a single unit, the lower ends of the studs support the ends of a pair of parallel supporting bars 9 and 10 extending across the face of the grinding disk, it being observed that these bars which determine the line of movement of the work are offset to one side of the true diameter of the disk. These supporting bars are L-shaped in section, the outer bar 9 having a relatively wide horizontal web $9^a$. Between the ends of the guide bars 9 and 10 are transverse blocks 11—11 to which said bars are bolted, the blocks in turn having screw threaded connection with the lower ends of the studs 7—7. On the underside of the horizontal webs of the supporting bars 9 and 10 are guide plates 12 and 13 respectively, the inside plate 13 being fixed and the outer plate 12 being adjustable transversely so as to vary the space between the opposed edges of the bars, depending on the width of the work to be ground. Thus the outer guide plate 12 (Figure 1) is provided with studs $12^a$ at intervals throughout its length which project through transverse slots $9^b$ in the horizontal web $9^a$ of the supporting bar 9. These guide bars just clear the surface of the disk and their inner edges form a track between which the work advances.

In the space or channel formed between the supporting bars is mounted the weight rack which will now be described. In the first place, it is a separate member which can be removed bodily and replaced by another in case work of a different thickness is to be handled. As such the pressure rack consists of two parallel side bars 14—14 spaced apart a distance equal to the width of the space between the supporting bars 9 and 10 and of a length to extend across the disk between the supporting frames 5—5. These bars 14—14 stand edgewise in the channel and at short intervals throughout their length are transverse pins 15 secured at their ends in a line of holes drilled a short distance above the lower edge of each bar, thus forming a rigid frame or rack. Mounted upon these pins are a multitude of thin plates 16 likewise arranged on edge and in parallel rows with spacing collars 17 mounted on the pins and rows of blades. Referring to Figure 8, it will be noted that each weight plate has two elongated slots $16^a$—$16^a$ spaced inwardly from their ends, the distance between the slots being the same as the distance between two adjacent pins of the rack. These plates are made of hardened steel to resist wear and are preferably rounded or beveled at each of their lower corners and their lower edges are beveled or rounded transversely, the purpose being to allow the plates to ride over the work passing beneath them without presenting any edges which might catch or hinder the progress of the work.

As before suggested, these plates are arranged in a series of rows, the plates of each row being carried on two adjacent pins throughout the length of the rack. Each alternate row of plates, however, is staggered, that is to say, the ends of the plates in one row are between the two pins which carry a single plate in the rows on either side. In this way, a flexible surface is presented to the work as it is advanced between the rack and the surface of the disk, the weight of the individual plates being sufficient to give the desired pressure of the work against the grinding surface. The weight rack is provided near each end with lugs $14^a$—$14^a$ consisting of short lengths of flat bar stock riveted to the outer faces of the side bars 14—14. These lugs fit into recesses in the supporting bars 9 and 10 which hold the rack stationary but permit it to be lifted out.

Referring now to the feeding mechanism, the same is located just beyond one end of the weight rack and outwardly from the side of the grinder housing. The feeding end of the device is determined by the direction of rotation of the disk which in this instance is counter-clockwise and hence the work is fed to the disk from the side of the machine which will cause the same to be carried across the disk by the rotation of the disk itself. Hence, the feeding mechanism would be located at the left end of the rack support and guide bars and the direction of movement would be from left to right.

The feeding mechanism is mounted upon a vertically adjustable platform or knee 18 supported in vertical gibs or guideways 19 on the side of the housing 3 of the grinding machine. The top face of the knee 18 extends longitudinally with respect to the path of the work and a short distance below the level of the grinding surface of the disk. An elevating screw 20 forms a part of the mechanism for adjusting the knee vertically, said screw being provided with a micrometer adjustment so that the parts of the feeding mechanism can be accurately positioned with respect to the plane of the grinding surface, it being essential that the work be advanced onto the disk perfectly flat.

Mounted upon the face of the knee 18 is a standard 21 supporting a bracket 22 consisting of an upright V-shaped portion facing outwardly and away from the machine and to which is bolted two vertical plates arranged in V-shape and providing a work magazine 23. Forwardly of the magazine supporting portion of the bracket 22 is an integral web 22ª extending toward the grinding machine and providing a support for a top feed plate 24 extending from the base of the magazine to the entrance to the channel between the work guide bars 9 and 10. Below the top feed plate 24 is a bottom feed plate 25 likewise extending to the work channel above the grinding disk and passing beneath the lower end of the magazine and some distance beyond. Secured along the side edges of the bottom feed plate are guide bars 26—27 (Figure 1) one of them, 26, being adjustable edgewise by means of bolts 26ª carried by the bottom feed plate 25 and projecting through elongated slots in the guide bar. These guide plates form a shallow channel extending from the magazine to the channel between the guide plates 12 and 13 traversing the grinding disk.

Also mounted on the platform of the knee 18 are two bearing standards 28 and 29 located on opposite sides of the bracket supporting standard 21. In these bearing standards are journalled shafts 30 and 30 on which are mounted belt pulleys 32—32 carrying a work feed belt 33. The outer bearing standard 28 is adjustable along the T-slots by means of an adjusting screw 28ª anchored in an end plate 31 extending from the outer end of the bottom feed plate 25 to the surface of the platform. The inner bearing standard 29 is bolted fast and its shaft 30 is driven by a small electric motor 34 mounted on one side of the knee 18 and operatively connected with the driven pulley shaft 30 by a belt 35 driven by a set of reduction worm gears 36 and 37 enclosed within a casing 38 just above the motor (Figure 4).

The feed belt 33 is so located that its upper lead passes below the bottom feed plate 25 which has a slot 25ª extending from one pulley to the other and beneath the magazine 23. At intervals along the feed belt are cleats 33ª which project upwardly through the slot in the bottom feed plate. The work A, which in this instance is assumed to be piston rings, are stacked one on top of another in the magazine 23 the bottom of the pile resting on the bottom feed plate 25. The motor 34 drives the feed belt in a clockwise direction so that each cleat 33ª successively engages the bottommost ring in the pile and carries it forward toward the rotating grinding disk. The rings are only carried as far as the edge of the grinding disk by the feed belt, the movement from there being one of each ring pushing those ahead of it. As each ring encounters the rapidly rotating grinding disk, it enters the zone of the weight rack at the same time so that there is sufficient downward pressure applied to each ring to produce the required friction during its progress across the face of the disk. Due to the rotating movement of the grinding disk, the rings likewise are rotated bodily as they are advanced, so that they are ground perfectly flat on the lower side. Should there be any unevenness or variation in the thickness of the rings, the weight plates are free to yield upwardly, thus relieving any excessive or uneven pressure on the work.

At the discharge end of the work guide and just beyond the weight rack is a plate 39 onto which the work is discharged as it leaves the disk. This plate projects beyond the edge of the housing 3 and is provided with guide plates 39ª—39ᵇ which form a channel in alignment with the guide plates extending across the grinding disk. One of these guide plates is adjustable and the other fixed. The plate 39 is mounted on a bracket 40 carried by the knee 18 immediately adjacent and supporting the feeding mechanism for the other unit. This bracket has a laterally projecting arm 40ª and the plate 39 is preferably formed integral therewith. Being carried by the knee 18, the plate 39 is adjustable vertically, thus assuring its perfect alignment with the grinding surface of the disk, but it will be observed that it is equally important that the work leave the disk and be fed onto the disk in a perfectly flat position, since in either case a slight tilting of the work would cause unequal grinding and result in untrue surfaces.

From the foregoing description, the operation of the machine is manifest. A supply of piston rings or work of like character is maintained in the magazine and successively fed from the bottom onto the grinding disk, the lower side or face only being ground to a perfectly flat surface after they have been discharged. They are now ready for the final grinding operation, a grinding machine having a magnetic chuck being preferably used for this purpose. Thus with one side perfectly true as to flatness, the rings can be placed in the chuck, flat side inward with the certainty that the ring will not be distorted or warped during the grinding of the outer face.

As before explained, other work can be handled in the same manner, the advantage being that a flat ground surface can be obtained on articles too fragile to withstand any considerable pressure during the process.

As already explained, the machine herein disclosed is designed for double duty, that is, with a duplication of identical feeding devices extending parallel with each other on the opposite side of the true diameter of the disk and with the feeding end of one unit adjacent the discharge end of the other unit, so that the work is fed from both sides of the machine at the same time and traversing the disk in opposite directions. In this manner the capacity of the machine is doubled, although a machine equipped with a single feeding device or unit would perform with equal satisfaction.

I claim as my invention:

1. In a grinding machine of the character described, the combination of a grinding disk rotative in a horizontal plane, means for guiding the work to be ground in a predetermined path across the face of said disk, and a plurality of vertically adjustable plates suspended above the path of the work and bearing edgewise thereon.

2. In a grinding machine of the character described, the combination of a grinding disk rotative in a horizontal plane, means for guiding the work to be ground in a predetermined path across the face of said disk, and a pressure member comprising a multitude of articulated units supported for vertical movement above the path of the work and adapted to exert their weight upon the same.

3. In a grinding machine of the character described, the combination of a grinding disk rotative in a horizontal plane, a track comprising guide bars extending across the face of said disk, and a multitude of vertically adjustable plates mounted between said guide bar and having a limited free vertical movement toward and from the work.

4. In a grinding machine of the character described, the combination of a grinding disk rotative in a horizontal plane, means for guiding the work to be ground in a predetermined path across the face of said disk, and a pressure rack mounted above the path of the work, and comprising a multitude of vertically adjustable plates mounted on said frame for vertical adjustment and adapted to bear edgewise on the advancing work.

5. In a grinding machine of the character described, the combination of a grinding disk rotative in a horizontal plane, means for guiding the work to be ground in a predetermined path across the face of said disk comprising a pair of parallel guide bars, a pressure rack supported between said guide members and above the path of said work and comprising a plurality of plates suspended edgewise on said rack and having limited vertical movement relative thereto.

6. In a grinding machine of the character described, the combination of a grinding disk rotative in a horizontal plane, means for guiding the work to be ground in a predetermined path across the face of said disk comprising a pair of parallel guide members, a pressure rack supported between said guide members and above the path of said work and comprising a plurality of rods extending transversely of the path of the work and spaced at predetermined intervals therealong, and a plurality of plates suspended edgewise on said rods and having limited vertical movement relative thereto.

7. In a grinding machine of the character described, the combination of a grinding disk rotative in a horizontal plane, means for guiding the work to be ground in a predetermined path across the face of said disk comprising a pair of parallel guide members, a pressure rack supported between said guide members and above the path of said work and comprising a plurality of rods extending transversely of the path of the work and spaced at predetermined intervals therealong, and a multitude of relatively short plates arranged in rows extending longitudinally of said rack, each plate being suspended edgewise on two adjacent rods for limited vertical movement relative thereto.

8. In a grinding machine of the character described, the combination of a vertical spindle grinder having a grinding disk rotating in a horizontal plane, a frame extending across the top of said grinder above the surface of said disk and comprising pairs of guide bars spaced apart and forming a channel therebetween for the work, a pressure rack supported between said guide bars and in said channel and comprising a pair of parallel side bars, a plurality of rods extending transversely between said side bars and a multiplicity of weight plates having transverse slots adjacent each end adapted to engage two adjacent rods, said plates being arranged in a plurality of rows, the plates of each row being staggered relative to the plates of adjacent rows, and spacing members mounted on said rods and between said rows.

9. In a work feeding device of the character described, the combination with a grinder having a grinding disk rotative in a horizontal plane, of a work guiding frame extending across the face of said disk and offset a predetermined distance from the diameter thereof, feeding mechanism at one end of said guide frame including a work magazine from which successive pieces of work are fed onto said disc and into said guide frame, and a pressure rack mounted on said frame and comprising a multiplicity of vertical adjustable plates supported in edgewise position and adapted to exert a pressure equal to their weight upon the advancing work.

Signed at Beloit, Wis., this 29th day of August, 1927.

JOHN MILLER, Jr.